Sept. 9, 1969  J. A. CHANDLER  3,465,482
SPACECRAFT RADIATOR COVER
Filed Dec. 26, 1967  2 Sheets-Sheet 1

Joseph A. Chandler
INVENTOR.

BY
ATTORNEYS

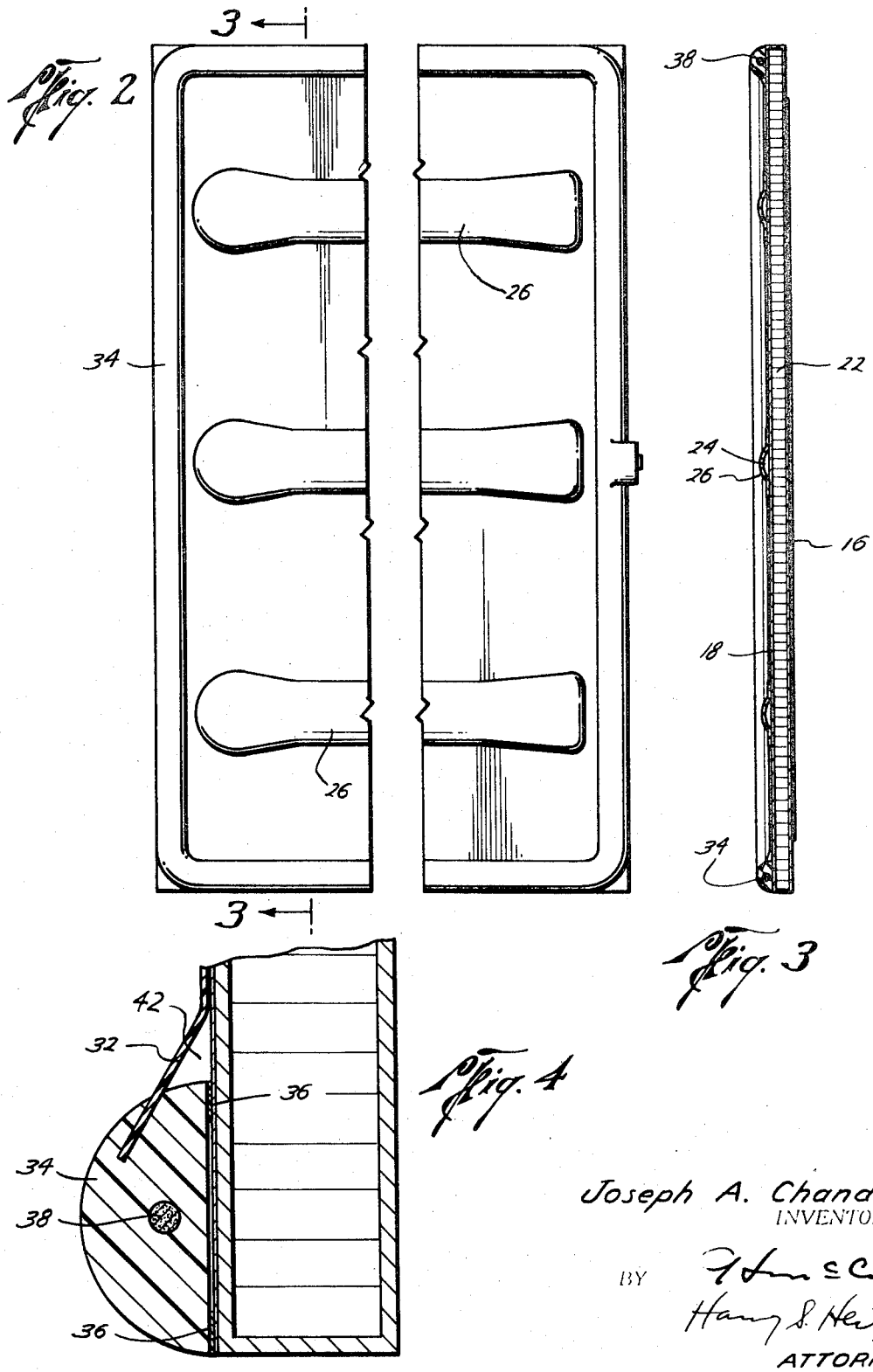

United States Patent Office 3,465,482
Patented Sept. 9, 1969

3,465,482
SPACECRAFT RADIATOR COVER
Joseph A. Chandler, Dickinson, Tex., assignor to the United States of America as represented by the Administrator of the National Aeronautics and Space Administration
Filed Dec. 26, 1967, Ser. No. 693,420
Int. Cl. E04h *14/00;* F42b *15/10*
U.S. Cl. 52—3                        4 Claims

ABSTRACT OF THE DISCLOSURE

The invention relates to a protective covering for use on a spacecraft where it is necessary to prevent degradation of the thermal control coating during assembly of the spacecraft and prior to and during launch, the invention comprises a cover made of a high strength, high temperature plastic film which is secured to an edge member frame which encircles the radiator surface, the edge member is bonded with a fairly brittle adhesive system to the edge of the radiator surface, in the center of the edge member is an explosive, mild detonating fuse, sized so that when detonated it will expand the edge member, but will not cause it to rupture.

---

The invention described herein may be manufactured and used by the Government of the United States of America for governmental purposes without the payment of any royalties thereon or therefor.

This invention relates in general to protective coverings and, more particularly, to a spacecraft radiator protective cover which may be removed, exposing the radiator once the spacecraft has attained orbit.

In the operation of a spacecraft during orbital space flights, large amounts of heat are produced which must be radiated from the spacecraft so as to prevent overheating of the spacecraft, its occupants, and equipment. Traditionally, the source of heat is transferred to a spacecraft radiator on the outer surface of the spacecraft and thereupon it is transmitted to the space environment. These spacecraft radiators are coated with a paint system coating to present the proper emissivity and absorptivity to the space environment. These coatings and the resultant efficiency of the thermal control system of a spacecraft are extremely sensitive to dirt or contaminants on the coating surface. To prevent degradation of the radiator coating during assembly of the spacecraft prior to launch and during launch from rocket motor exhaust fumes, it is necessary to protect the radiator. Previously radiator covers have been hard structural devices which were quite heavy and required internal cooling systems to cool the radiators while the spacecraft was operational on the launch pad during the checkout of systems. The disadvantage of these prior cover designs was that the large weight required additional booster power for lifting the spacecraft, and additional ground support equipment was needed to provide the necessary ground cooling of the radiator cover.

In order to overcome the attendant disadvantages of prior art spacecraft radiator covers, the radiator cover of the present invention is a high strength, high temperature resistant plastic film which is secured to an edge member frame which encircles the radiator surface. When the spacecraft has attained orbit, the spacecraft radiator cover is removed, revealing a clean radiator surface. The resultant advantages of this invention are a much lighter in weight cover, approximately 1/20 of the previously used rigid structures, elimination of ground support cooling systems, and radiation of heat through the cover when necessary.

More particularly, the invention comprises a cover of high strength, high temperature resistant plastic film which in one embodiment is moulded into an elastomeric edge member frame which encircles the radiator surface. The elastomeric edge member is bonded with a fairly brittle adhesive system to the edge of the radiator surface. Moulded into the geometric center of the elastomeric edge member is an explosive, mild detonating fuse sized so that when detonated it will expand the elastomeric edge member about four times its original size, but will not cause it to rupture. After the cover edge member has been bonded to the radiator, the space between the plastic film and radiator surface is evacuated with a high vacuum pump system and then sealed. Thus, external atmospheric pressure on the plastic film is maintained, holding it in intimate contact with the radiator surface at all times until the spacecraft is boosted above the atmosphere. When the spacecraft has attained orbit, the mild detonating fuse is detonated upon command. The edge member expands in all directions, breaking the adhesive bond and accelerating the center of the mass away from the radiator surface with such impulse that it pulls the plastic film which is a much smaller mass away from the spacecraft. All products of the detonation are retained inside the edge member and the radiator surface is thus left clean. In an alternative embodiment, the edge member frame is a soft aluminum tube with the fuse mounted within the tube.

The advantages of this invention, both as to its construction and mode of operation, will be readily appreciated as the same becomes better understood by reference to the following detailed description when considered in connection with the accompanying drawings in which like reference numerals designate like parts throughout the figures, and wherein:

FIG. 2 is a perspective view of the radiator cover mounted over a typical spacecraft radiator;

FIG. 3 is a side view of the spacecraft radiator and cover taken along the lines 3—3 of FIG. 2;

FIG. 4 is a blown up sectional view of the edge member secured to the cover.

Figure 1:
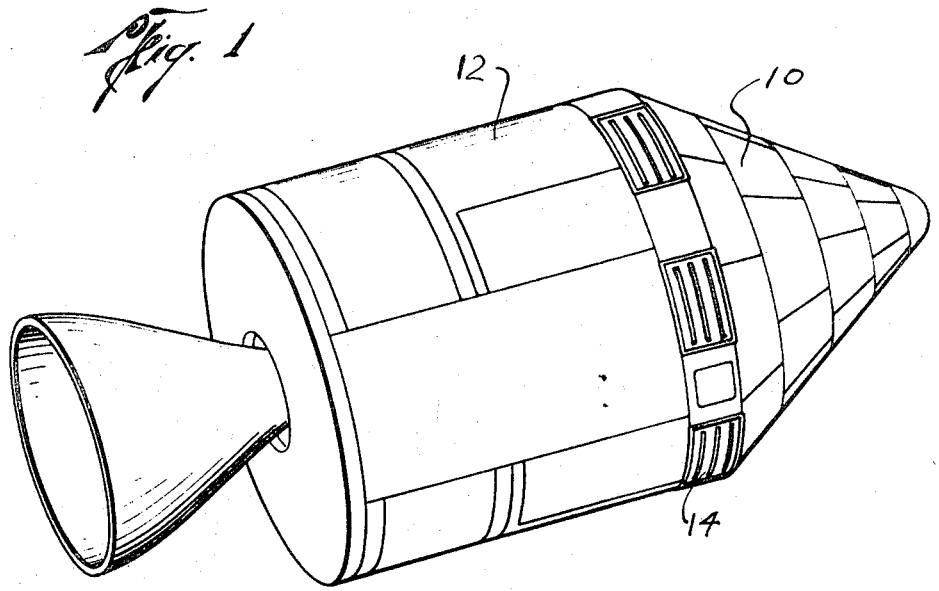
FIG. 1 is a perspective view of the spacecraft module embodying the novel radiator in accordance with this invention.

Referring now to the drawings, there is shown in FIG. 1 a spacecraft module utilizing a preferred embodiment of the invention. The spacecraft module comprises a command module 10 and a service module 12. Normally the command module will carry the entire crew during launch and reentry and during the major portion of the mission. The service module is completely unmanned but support the command module with power, propulsion, and oxygen for cabin atmosphere. There are numerous sources of heat within the service module such as fuel cells which are used to generate electricity and the environmental control system. This heat is transferred through spacecraft radiators 14 which are on the external surface of the service module. Normally the spacecraft radiators are coated with a paint system coating to present the proper emissivity and absorptivity to the space environment.

Referring now to FIGS. 2–4, there is shown a spacecraft radiator and boost protective cover in accordance with the invention. The radiator comprises an inner aluminum face sheet 16 which is mounted adjacent to the outer structure of the service module and an outer aluminum face sheet 18 which is coated with a paint to give the desired emissivity and absorptivity to the space environment. Sandwiched between the aluminum sheets 16 and 18 is a Fiberglas honeycomb substructure 22. Heat which is produced by the service module is transferred through fluid channels 24 mounted on the outer surface of the outer sheet 18 at selected portions of the radiator. The heat in the channels is transferred to the face sheet 18 where it is radiated into space. The fluid channels are formed of an aluminum member 26 which is formed by a diffusion bonding laminating process. The area for the fluid has an inhibitor to prevent bonding such that after the bonding operation, the areas which are not bonded due to the inhibitor can be expanded by pressurizing the radiator surface in a closed die.

The entire outer surface of the radiator is covered with a high temperature resistant plastic film 32 such as Kapton which is coated on its exterior surface with a radiative paint. The film 32 is moulded into an elastomeric edge member frame which encircles the radiator surface. The edge member 34 of the elastomeric frame is bonded with a fairly brittle adhesive 36 to the outer surface of the radiator. Moulded within the geometric center of the elastomeric edge member 34 is an explosive, mild detonating fuse 38, sized so that when it is detonated it will expand the elastomer 34 about four times its original size, but will not cause it to rupture.

After the cover edge member is bonded to the radiator, the space 42 between the plastic film 32 and the radiator surface is evacuated with a high vacuum pump system and sealed. This vacuum maintains external pressure on the plastic film, holding it in intimate contact with the radiator surface at all times until the spacecraft is boosted above the atmosphere.

When spacecraft has attained orbit, the mild detonating fuse 38 is detonated upon command. The edge member 34 expands in all directions, breaking the adhesive bond 36 and accelerating the center of the mass away from the radiator surface with such impulse that it pulls the plastic film 32, which is a much smaller mass, away from the spacecraft. All parts of the detonation are retained inside the edge member 34. The radiator surface is left clean to perform its function.

Figure 5:
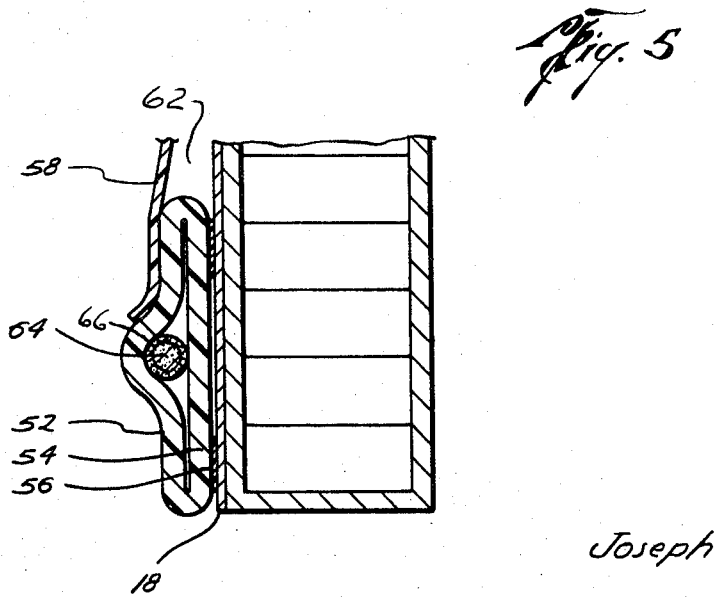
FIG. 5 is an alternative blown up sectional view of an edge member secured to the cover.

Referring now to FIG. 5, there is shown an alternative embodiment of the edge member which contains the explosive charge. A soft aluminum tube 52 which is initially round and processed through a roll forming die is secured at its flat edge 54 by means of a brittle adhesive 56 to the outer aluminum sheet 18. The Kapton plastic film 58 is bonded to the outer surface of the tube 52 by means of a ductile adhesive. Then the area 62 between the film 58 and outer aluminum sheet is evacuated. The explosive charge 64 which is a mild detonating fuse is surrounded within the tube 52 by means of a thin walled elastomeric tube 66. Upon explosion, the tube 52 returns to substantially its original shape and separates from the spacecraft. The elastomeric tube dampens initially high pressure shock waves which could rupture the tube 52.

What is claimed and desired to be secured by Letters Patent is:

1. A removable cover system for protecting a coating on a surface member comprising:
   a plastic film positioned adjacent to said coating;
   an edge member bonded to said surface member along the periphery of said surface member by a brittle adhesive;
   means for securing said plastic film to said edge member; and
   means for separating said edge member from said surface member comprising a detonating fuse contained within said edge member, said detonating fuse being sized to expand but not rupture said edge member thereby destroying the adhesive bond between the edge member and the surface member while containing the contaminants from the detonating member.

2. A removable cover system in accordance with claim 1 wherein said edge member is elastomeric, said plastic film being moulded into said edge member.

3. A removable cover system in accordance with claim 1 wherein said edge member comprises an aluminum tube, said plastic film being bonded to said aluminum tube.

4. The removable cover system in accordance with claim 1 wherein the space between the film and the surface member is evacuated whereby the plastic film will be in intimate contact with the surface member.

References Cited
UNITED STATES PATENTS

| | | | |
|---|---|---|---|
| 2,205,423 | 6/1940 | Lefebure | 52—173 X |
| 3,135,163 | 6/1954 | Mechlin et al. | 89—1.817 X |
| 3,141,297 | 7/1964 | Shields | 102—49.5 |
| 3,172,330 | 3/1965 | Lidmalm et al. | 89—1.817 |
| 3,307,306 | 3/1967 | Oliver | 52—173 |

FRANK L. ABBOTT, Primary Examiner

S. D. BURKE III, Assistant Examiner

U.S. Cl. X.R.

52—99, 173; 102—49.5